(12) United States Patent
Nasato (10) Patent No.: US 10,835,857 B2
(45) Date of Patent: Nov. 17, 2020

(54) METHOD AND APPARATUS FOR SULFUR RECOVERY

(71) Applicant: WorleyParsons Europe Ltd., Brentford (GB)

(72) Inventor: Elmo Nasato, Oakville (CA)

(73) Assignee: WorleyParsons Europe Ltd., Brentford (GB)

( * ) Notice: Subject to any disclaimer, the term of this patent is extended or adjusted under 35 U.S.C. 154(b) by 158 days.

(21) Appl. No.: 15/312,307

(22) PCT Filed: May 19, 2015

(86) PCT No.: PCT/CA2015/050447
§ 371 (c)(1),
(2) Date: Nov. 18, 2016

(87) PCT Pub. No.: WO2015/176180
PCT Pub. Date: Nov. 26, 2015

(65) Prior Publication Data
US 2017/0072360 A1    Mar. 16, 2017

Related U.S. Application Data

(60) Provisional application No. 62/000,845, filed on May 20, 2014.

(51) Int. Cl.
*B01D 53/14* (2006.01)
*C01B 17/04* (2006.01)

(52) U.S. Cl.
CPC ..... *B01D 53/1418* (2013.01); *B01D 53/1468* (2013.01); *C01B 17/04* (2013.01); *C01B 17/0413* (2013.01); *B01D 2252/204* (2013.01)

(58) Field of Classification Search
None
See application file for complete search history.

(56) References Cited

U.S. PATENT DOCUMENTS 3,532,468 A * 10/1970 Beavon ............... C01B 17/0404
137/206
4,181,506 A * 1/1980 Bengtsson ............... C01B 17/60
423/242.1

(Continued)

FOREIGN PATENT DOCUMENTS

CA        1312447 C      1/1993
CN      102161476 A      8/2011

(Continued)

OTHER PUBLICATIONS

Extended European Search Report issued in corresponding European Application No. 15796203.6 dated Nov. 11, 2017 (7 pages).
Office Action issued in corresponding Japanese Application No. 2014-513283 dated Oct. 24, 2017, and English translation thereof (8 pages).

(Continued)

*Primary Examiner* — Anita Nassiri-Motlagh
(74) *Attorney, Agent, or Firm* — Osha Bergman Watanabe & Burton LLP (57) ABSTRACT

A method for treating an acid gas stream in a sulfur recovery system is provided, the method including providing a motive fluid to an ejector, providing the acid gas stream to the ejector to obtain a mixture, the mixture comprising the motive fluid and the acid gas stream, providing the mixture to a reaction furnace, providing a combustion gas to the reaction furnace, the combustion gas comprising oxygen, and reacting the contents of the reaction furnace. An apparatus for treating an acid gas stream is also provided.

19 Claims, 3 Drawing Sheets

(56) References Cited

U.S. PATENT DOCUMENTS

| | | | |
|---|---|---|---|
| 4,888,162 A * | 12/1989 | Brian | ............ C01B 17/0413 |
| | | | 423/574.1 |
| 5,294,428 A | 3/1994 | Watson | |
| 6,508,998 B1 | 1/2003 | Nasato | |
| 7,597,871 B2 | 10/2009 | Ferrell | |
| 8,440,160 B1 | 5/2013 | Rameshni et al. | |
| 2014/0079614 A1 | 3/2014 | Liu et al. | |

FOREIGN PATENT DOCUMENTS

| | | |
|---|---|---|
| CN | 103539077 A | 1/2014 |
| CN | 103663386 A | 3/2014 |
| JP | H09-124309 A | 5/1997 |
| JP | 2004345904 A | 12/2004 |

OTHER PUBLICATIONS

International Search Report issued in PCT/CA2015/050447, dated Sep. 2, 2015 (2 pages).

Written Opinion of the International Searching Authority issued in PCT/CA2015/050447, dated Sep. 2, 2015 (3 pages).

Office Action issued in corresponding Korean Application No. 10-2016-7032837 dated Jan. 12, 2018, and English translation thereof (13 pages).

Office Action issued in corresponding Chinese Application No. 201580026326.4 dated Aug. 2, 2018, and English translation thereof (24 pages).

Office Action issued in corresponding Eurasian Application No. 201692333 dated Jul. 31, 2018, and English translation thereof (4 pages).

* cited by examiner

METHOD AND APPARATUS FOR SULFUR RECOVERY

CROSS REFERENCE TO PRIOR APPLICATIONS

The present application claims priority under the Paris Convention to U.S. Application No. 62/000,845, filed May 20, 2014, the entire content of which is incorporated herein by reference.

TECHNICAL FIELD

The following relates generally to methods and apparatuses for sulfur recovery. In particular, the following relates to recovery of sulfur from acid gas streams in Claus plants.

BACKGROUND

Sulfur recovery units (SRUs) are widely used to recover sulfur from acid gas streams. For example, an acid gas stream can be produced through amine gas treating process, wherein sour gas containing hydrogen sulfide ($H_2S$) is passed through an absorber unit and a regenerator unit to produce a gas stream rich in hydrogen sulfide, which is commonly known as the amine acid gas stream. Depending on the composition of the sour gas, the acid gas stream may also contain other components, such as carbon dioxide ($CO_2$), water vapour ($H_2O$), ammonia ($NH_3$), and other impurities.

Generally, sulfur is recovered from acid gas stream in sulfur recovery units using a process known as the Claus process, which is described, for example, in the article titled "Fundamentals of Sulfur Recovery by the Claus Process" by B. G. Goar, published in Gas Conditioning Conference Report (1977).

It is also known that the capacity of the sulfur recovery unit can be enhanced through oxygen enrichment, which is a process wherein a supplemental oxygen stream is introduced into the reaction furnace to increase the concentration of oxygen in the furnace. The increased oxygen concentration increases the amount of hydrogen sulfide that is combusted during the Claus process. The capacity of the SRU is typically increased when oxygen enrichment is used, primarily because a portion of the inert gas (e.g. nitrogen) that is normally present in ambient air is replaced with supplemental oxygen, which hydraulically unloads the SRU. This allows an increased amount of acid gas feed to be introduced to the SRU, therefore raising the overall sulfur production rate.

However, the degree to which oxygen enrichment can be used in a commercial Claus plant is generally limited by the maximum allowable operating temperature of the refractory material used in the reaction furnace of the SRU. For example, typical refractory material used in commercially available reaction furnaces have continuous maximum operating temperatures of up to around 2850° F. (1565° C.). To reduce the stress on the refractory material, operators of Claus plants may conservatively limit the operating temperature to as low as between 2500° F. and 2600° F. Since oxygen enrichment generally increases the operating temperature, the amount of oxygen being added into the reaction furnace is closely monitored and controlled to ensure that the operating temperature does not exceed the desired or maximum allowable temperature of the refractory material. As a result, the degree of oxygen enrichment is generally limited and thus the capacity of these SRUs remain relatively low.

Some attempts have been made to increase the capacity of the SRUs, particularly in Claus plants where oxygen enrichment is used. For example, U.S. Pat. No. 6,508,998 to Nasato describes a process for improving the SRU capacity in an oxygen enriched Claus plant by introducing a process recycle stream through an ejector into the furnace, such that the recycle stream acts as a heat sink for controlling the operating temperature in the reaction furnace. However, such process can be challenging to implement in some cases, since it requires handling of the recycle gas stream. Since the recycle gas stream is typically at the sulfur dew point, the sulfur vapor in the recycle stream may condense to liquid and subsequently solidify and deposit inside reaction furnace burner and/or process lines. Condensation or solidification of sulfur is an operating hazard, since it may result in reduced Claus plant capacity, poor burner performance, or catastrophic equipment failures. Moreover, recycle stream may contain undesirable contaminants such as ammonia, ammonia salts, and unburnt hydrocarbons, which can result in the formation of solid salts which can foul the equipment and reduce the capacity or affect the performance of the SRU. The process will also generally require a steam jacket for the ejector and process lines as well as recycle piping and valves to operate properly, which increases the cost of implementation and operation of the plant.

U.S. Pat. No. 5,294,428 to Watson describes a two-stage combustion process for recovering sulfur from a feed gas stream containing hydrogen sulfide. In Watson's process, two separate combustion regions are used to handle the heat load resulting from the oxygen enriched combustion process. However, Watson's process requires two sets of thermal stage equipment and a relatively large plot space to install all of the required equipment. Accordingly, the process is generally expensive and difficult to implement, especially when retrofitting an existing Claus plant where there may be space limitations.

It is an object of the following to address at least one of the above disadvantages.

SUMMARY

In one aspect, a sulfur recovery system is provided, the system comprising a reaction furnace, a motive fluid stream for providing a motive fluid to an ejector, an acid gas stream for providing an acid gas to the ejector, the ejector connected to the reaction furnace for providing to the reaction furnace a mixture comprising the motive fluid and the acid gas, and a combustion gas supply stream connected to the reaction furnace for providing a combustion gas to the reaction furnace, the combustion gas comprising oxygen.

In another aspect, a method for treating an acid gas stream in a sulfur recovery system is provided, the method comprising providing a motive fluid to an ejector, providing the acid gas stream to the ejector to obtain a mixture, the mixture comprising the motive fluid and the acid gas stream, providing the mixture to a reaction furnace, providing a combustion gas to the reaction furnace, the combustion gas comprising oxygen, and reacting the contents of the reaction furnace.

BRIEF DESCRIPTION OF THE DRAWINGS

The features of the invention will become more apparent in the following detailed description in which reference is made to the appended drawings wherein.

DETAILED DESCRIPTION

The terms "comprise", "comprises", "comprised" or "comprising" may be used in the present specification. As used herein (including the description and/or the claims), these terms are to be interpreted as specifying the presence of the stated features, integers, steps or components, but not as precluding the presence of one or more other feature, integer, step, component or a group thereof as would be apparent to persons having ordinary skill in the relevant art.

In one aspect, a sulfur recovery system is provided, the sulfur recovery system comprising a reaction furnace, a motive fluid stream for providing a motive fluid to an ejector, an acid gas stream for providing an acid gas to the ejector, the ejector being connected to the reaction furnace for providing to the reaction furnace a mixture comprising the motive fluid and the acid gas, and a combustion gas supply stream connected to the reaction furnace for providing a combustion gas to the reaction furnace, the combustion gas comprising oxygen. For example, the combustion gas may be air, a mixture of air and supplemental oxygen, or pure oxygen.

In one embodiment, the motive fluid stream is supplied to the ejector at a first pressure, and the acid gas stream is supplied to the ejector at a second pressure, the first pressure being greater than the second pressure.

In one embodiment, the acid gas comprises amine acid gas. For example, amine acid gas may be produced by processing sour gas with the amine gas treating process, which is well known in the art. In another embodiment, the acid gas comprises sour water stripper acid gas. As will be appreciated, the acid gas will generally comprise at least 5 mole percent hydrogen sulfide and typically up to about 80-95 mole percent hydrogen sulfide. It will be understood that amine acid gas may comprise other gases including, but not limited to, carbon dioxide, water vapour, ammonia, and other impurities. As will be appreciated, the acid gas stream as used herein is generally a clean stream and not a recycled stream (i.e. a stream which has been at least partially treated by the Claus process).

In one embodiment, the motive fluid comprises steam. In other embodiments, the motive fluid may comprise pressurized liquid water, water vapor, supersaturated water vapor, hydrogen sulfide, sulfur dioxide, carbon dioxide, or mixtures thereof.

In one embodiment, the system further comprises a sulfur recovery block connected to the reaction furnace for receiving an effluent stream from the reaction furnace, and a back pressure control valve positioned downstream from the sulfur recovery block for controlling the operating pressure of the sulfur recovery block.

In another embodiment, the sulfur recovery system further comprises a sulfur recovery block connected to the reaction furnace for receiving an effluent stream from the reaction furnace, a tail gas treatment block connected to the reaction furnace for receiving a tail gas stream from the sulfur recovery block, and a back pressure control valve positioned downstream from the tail gas treatment unit for controlling the operating pressure of at least one of the tail gas treatment unit block and the sulfur recovery block. The sulfur recovery system may also include another back pressure control valve positioned downstream of the sulfur recovery block, but upstream of the tail gas treatment unit block.

Figure 1:
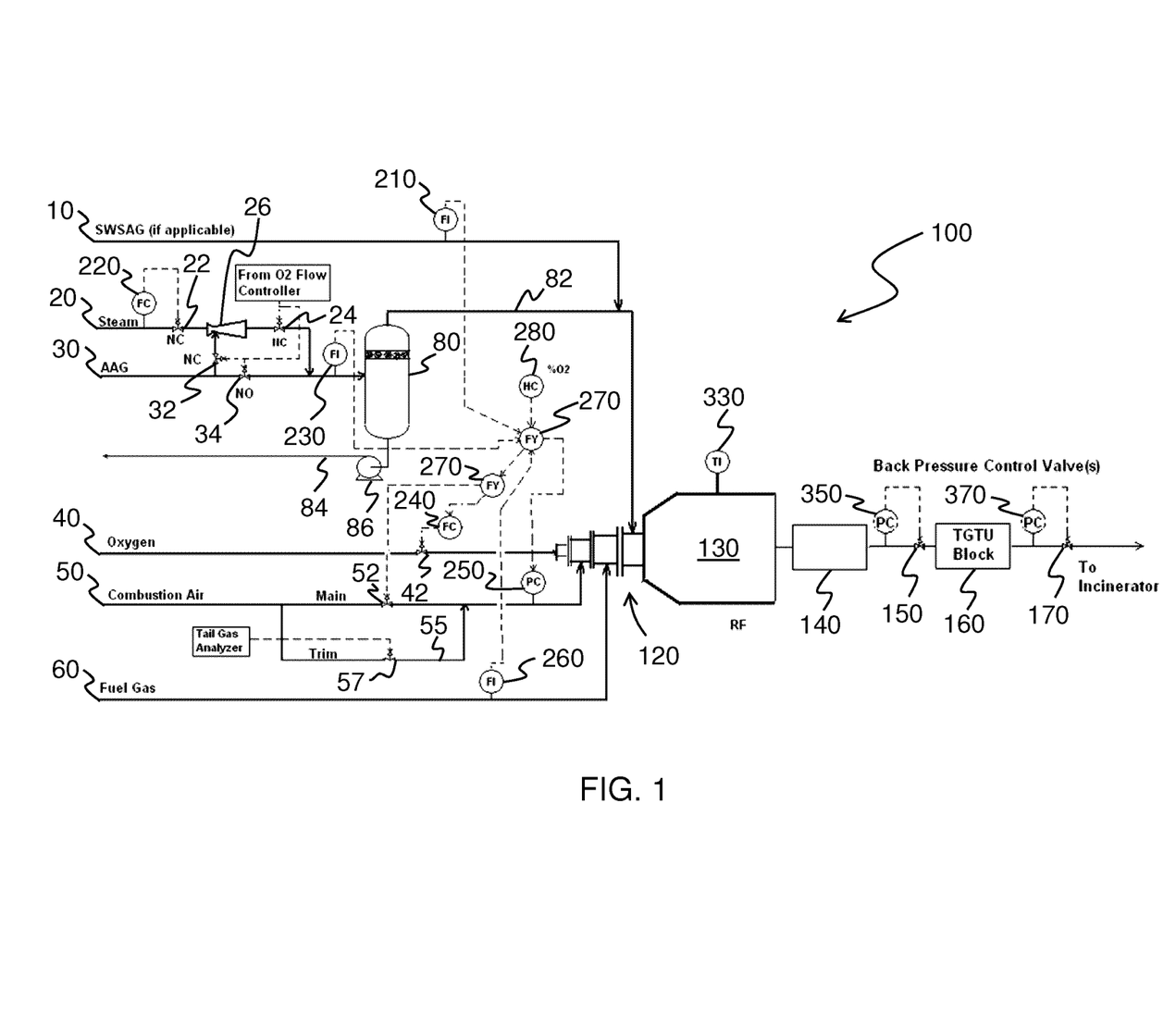
FIG. 1 is a schematic diagram of a sulfur recovery system according to one embodiment.

FIG. 1 is a schematic of a sulfur recovery system 100 according to one embodiment. In the sulfur recovery system 100, an acid gas feed stream 30 is used to introduce amine acid gas, and a steam supply line 20 is used to introduce steam. The acid gas feed stream 30 and the steam supply line 20 are connected to a vapor-liquid separator 80, which is used to separate out any liquid present in the input streams. Any liquid that is separated from the input streams is pressurized by a compressor 86 and removed via line 84, and the separated gas is provided to the burner 120 of the reaction furnace 130 via line 82.

An oxygen inlet stream 40 and an air inlet stream 50 is used to introduce oxygen and air, respectively, to the burner 120. In the embodiment of FIG. 1, the air inlet stream 50 is shown as having a main line and a trim line 55. Other inlet streams, such as a sour water stripper acid gas (SWSAG) stream 10 and a fuel gas stream 60 may also be connected to the burner 120 for introducing additional gases to the burner. For example, the SWSAG stream 10 may be used to introduce a gas stream comprising $H_2S$ and $NH_3$, and the fuel gas stream 60 may be used to introduce fuel for the burner 120.

In the configuration of system 100, an ejector 26 is illustrated as being connected to the steam supply line 20 and the acid gas feed stream 30. The steam being carried by the steam supply line 20 is generally a high pressure steam, which acts as a motive fluid when introduced into the ejector 26. In use, the amine acid gas being carried by the acid gas feed stream 30 is introduced into the ejector 26 as the suction fluid to produce an output stream, which is then fed into the burner 120 via the vapor-liquid separator 80 and line 82. It will be appreciated that since the output stream of the ejector 26 is formed by mixing the high pressure steam with the amine acid gas, the pressure of the output stream will generally be greater than the pressure of the input amine acid gas, but lower than the pressure of the input steam.

The mixture of inlet streams are then combusted in the burner 120 and evolved into the reaction furnace 130, where the reactions of the Claus process occur. Specifically, in the reaction furnace 130, approximately one third of hydrogen sulfide is reacted with oxygen to produce sulfur dioxide and water, and the remaining hydrogen sulfide is reacted with the sulfur dioxide to produce sulfur and water. These reactions are represented by the following formulae:

$$H_2S + 3/2 O_2 \rightarrow SO_2 + H_2O$$

$$2H_2S + SO_2 \rightarrow 3/2 S_2 + 2H_2O$$

The effluent from the reaction furnace 130 is then sent to a sulfur recovery block 140, which is generally used to extract sulfur from the reaction furnace effluent. For example, the sulfur recovery block 140 may comprise one or more condensers, heaters, and/or catalytic converter reactors. Such components are well known and reactions which may occur in such components are described, for example, in U.S. Pat. No. 6,508,998 to Nasato and U.S. Pat. No. 7,597,871 to Ferrell.

The stream exiting the sulfur recovery block 140 may then be introduced into a tail gas treatment unit (TGTU) block 160, which is used to reduce the amount of any residual sulfur bearing compounds present in the stream. The stream exiting the TGTU block 160 is sent to an incinerator before being released into the atmosphere. Alternatively, the stream exiting the sulfur recovery block 140 may be directly sent to the incinerator without being passed through the TGTU block 160, if the gas being vented from the incinerator is at an acceptable sulfur content level for meeting the emission standards.

The system 100 further includes a number of valves for regulating the flow of gases through various streams and lines. As illustrated in FIG. 1, the flow of pressurized steam through steam supply line 20 and the flow of amine acid gas through the acid gas feed stream 30 are regulated by normally closed (NC) valves 22, 32 and normally open (NO) valve 34. The outlet of the ejector 26 is regulated by the NC valve 24. In the oxygen inlet stream 40, the flow of gas is regulated by valve 42, and in the air inlet stream 50, the flow is regulated by valve 52 in the main line and by valve 57 in the trim line 55.

The valves are generally controlled according to one or more parameters measured in the system 100. For example, NC valve 22 for regulating the flow of steam is adjusted according to the amount of flow measured by the flow control 220. As illustrated in FIG. 1, other NC valves 24, 32 and NO valve 34 are controlled by the flow controller 240, which is connected to valve 42 positioned on the oxygen inlet stream 40. Valve 52 positioned on the main line of the air inlet stream 50 is controlled by a controller unit 270, and valve 57 positioned on the trim line 55 is controlled by the tail gas analyzer.

Various measurement units, controllers and/or indicators are located throughout the system 100 for monitoring and/or controlling different process parameters. For example, flow indicators 210, 230, 260 are located on the SWSAG stream 10, acid gas feed stream 30, and the fuel gas stream 60, respectively, for measuring the flow of gas through each of the respective streams. Pressure controller 250, which is in communication with the controller unit 270, is located on the air inlet stream 50 for controlling the pressure of the gas flowing through the air inlet stream 50. The measurements taken from these measurement units, controllers and/or indicators are transmitted to the controller unit 270, and if necessary, the controller unit 270 may generate and transmit signals to control the flow of gas in various inlet/outlet streams. As shown, a hand control unit 280 for manually controlling the control unit 270 may be provided. Additionally, the temperature inside the reaction furnace 130 may be monitored by a temperature indicator 330.

In one embodiment, one or more back pressure control valves are located downstream of the sulfur recovery block 140. The one or more back pressure control valves are generally used to control the operating pressure of any sulfur recovery systems located upstream from the one or more valves. For example, in the system 100 illustrated in FIG. 1, a first back pressure control valve 170 is located downstream of the TGTU block 160 and the sulfur recovery block 140 for controlling the operating pressure of the sulfur recovery block 140 and/or the TGTU block 160, and a second back pressure control valve 150 is located downstream of the sulfur recovery block 140 but upstream of the TGTU block 160 for controlling the operating pressure of the sulfur recovery block 140. Alternatively, the system 100 may comprise only the first pressure control valve 170 and not the second pressure control valve 150 if sufficient control of the operating pressure in both sulfur recovery systems can be attained using only one back pressure control valve.

In other embodiments where the system does not include a TGTU block, the tail gas exiting from the sulfur recovery block may be sent directly to the incinerator. In such embodiments, the pressure control valve may be located between the sulfur recovery block and the incinerator to control the operating pressure of the sulfur recovery block. Alternatively, it will be appreciated that the pressure control valve may be located downstream of the incinerator and upstream of the stack.

The one or more back pressure control valves are generally adjusted according to various measurements taken from the system 100. In the embodiment illustrated in FIG. 1, the first back pressure control valve 170 is controlled by the pressure controller 370 and the second pressure control valve 150 is controlled by the pressure controller 350. The pressure controllers 350, 370 are configured to monitor the pressure of any sulfur recovery systems located upstream of the respective valves, and control the respective valves 150, 170 to adjust the operating pressure of these sulfur recovery systems. By restricting the flow of gas exiting the sulfur recovery block 140 and/or the TGTU block 160 using the one or more back pressure control valves, the operating pressure within these blocks are increased, thus enhancing recovery of sulfur from the acid gas stream.

The system described above may be advantageous over some other systems known in the art in certain cases. For example, since the ejector 26 does not require a steam jacket to operate, the costs and complexity associated with installing the system are kept relatively low. Moreover, since only one set of thermal stage equipment is required in system 100, no manifolding or flow splitting of Claus plant feed stream is needed. This also reduces the costs and complexity of installation, operation and maintenance. Further advantages may be realized especially in cases where the system 100 is retrofitted to an existing Claus plant or system, since installation of the components will not generally require additional plot space for most existing Claus plants or systems.

It will be appreciated that in other embodiments, a second ejector may be configured in a similar way as the ejector 26 to enhance the pressure of the SWSAG stream 10 before SWSAG is introduced to the burner 120. In yet another embodiment, the SWSAG stream 10 may be combined with the acid gas feed stream 30 before entering the ejector 26.

In one aspect, a method for treating an acid gas stream in a sulfur recovery system is provided, the method comprising providing a motive fluid to an ejector, providing the acid gas stream to the ejector to obtain a mixture, the mixture comprising the motive fluid and the acid gas stream, providing the mixture to a reaction furnace, providing a combustion gas to the reaction furnace, the combustion gas comprising oxygen, and reacting the contents of the reaction furnace. For example, the combustion gas may be air, a mixture of air and supplemental oxygen, or pure oxygen.

In one embodiment, the motive fluid is provided at a first pressure and the acid gas stream is provided at a second pressure, wherein the first pressure is greater than the second pressure.

In one embodiment, the motive fluid comprises steam. For example, in the embodiment of FIG. 1, steam is illustrated as being introduced into the ejector 26 via the steam supply line 20 as the motive fluid for the ejector 26. In other embodiments, the motive fluid may comprise water vapor, supersaturated water vapor, hydrogen sulfide, sulfur dioxide, carbon dioxide, and/or mixtures thereof.

Figure 2:
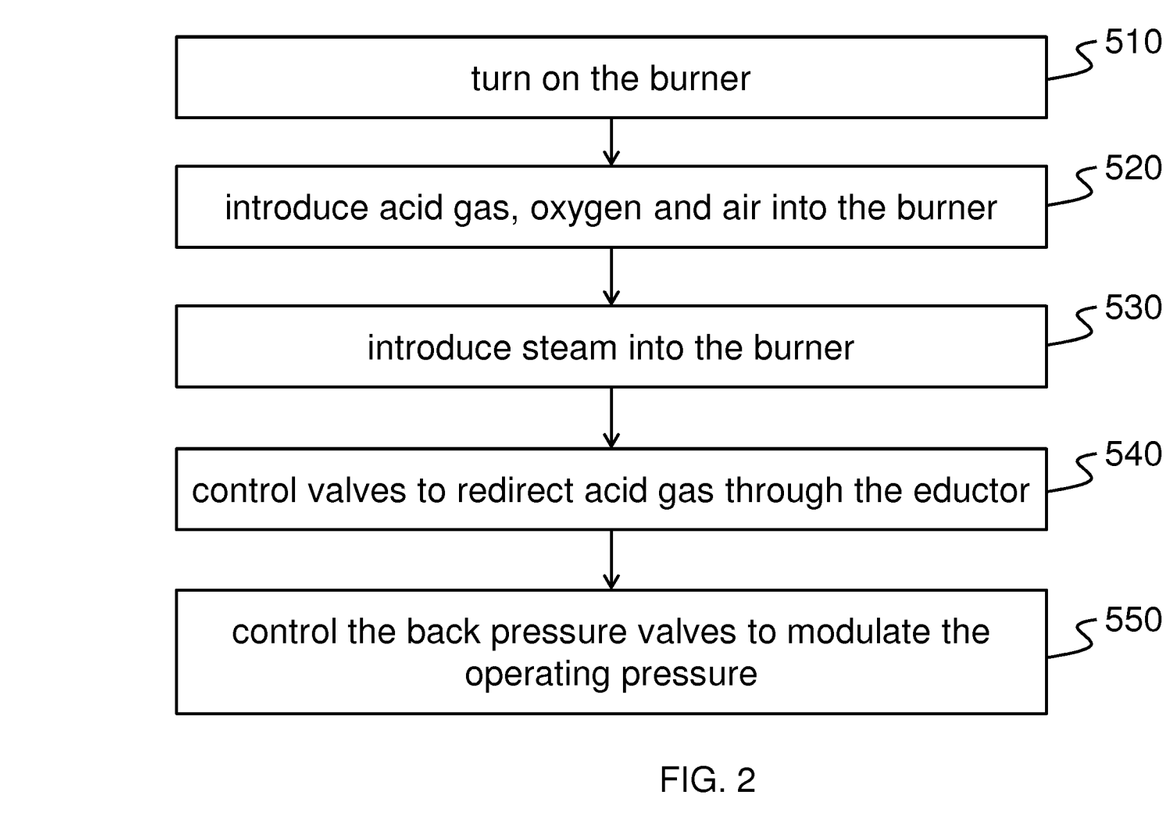
FIG. 2 is a flow diagram illustrating a method for recovering sulfur according to one embodiment.

FIG. 2 is a flow diagram illustrating the method according to one embodiment. For greater clarity, the method is described in relation to the system 100 shown in FIG. 1. In 510, the burner 120 of the reaction furnace 130 is turned on. For example, the burner 120 may be started by supplying a fuel gas through the fuel gas stream 60 and igniting the fuel gas. In 520, acid gas, oxygen, and air is supplied to the burner 120 through the acid gas feed stream 30, the oxygen inlet stream 40, and the air inlet stream 50, respectively. As will be appreciated, NC valves 22, 24, 32 are closed and the NO valve 34 is generally open at this stage, to enable the acid gas to flow through the acid gas feed stream 30 into the vapor-liquid separator 80, and to the burner 120 via line 82. The amount of oxygen and air flowing into the burner 120 may be regulated by adjusting the valves 42, 52, 57.

Although the fuel gas is typically shut off once the acid gas, oxygen and air is introduced into the burner 120, it will be appreciated that the fuel gas stream 60 may continue to supply fuel to the burner 120, especially in cases where the burner 120 cannot sustain the flame at the desired temperature without the fuel gas. For example, this may occur in cases where the acid gas is rich in carbon dioxide.

In 530, the motive fluid is introduced into the ejector 26. In the embodiment of FIG. 1, the motive fluid is steam being carried by the steam supply line 20. In order to introduce the steam, NC valves 22, 24 are at least partially opened such that steam may travel through the ejector 26 into the vapor-liquid separator 80, and to the burner 120 via line 82. In one embodiment, the motive fluid is introduced when the oxygen concentration reaches 30 to 35 volume percent of the air and oxygen stream mixture. Once steam is introduced, NO valve 34 located on the acid gas feed stream 30 is closed to redirect the flow of the acid gas into the ejector 26 in 540. In this way, the pressure of the acid gas being introduced into the burner 120 through line 82 is increased, since the high pressure steam from line 20 is mixed with the acid gas from line 30. Furthermore, introduction of steam lowers the temperature inside the reaction furnace, thus enhancing the capacity as will be explained below.

Figure 3:
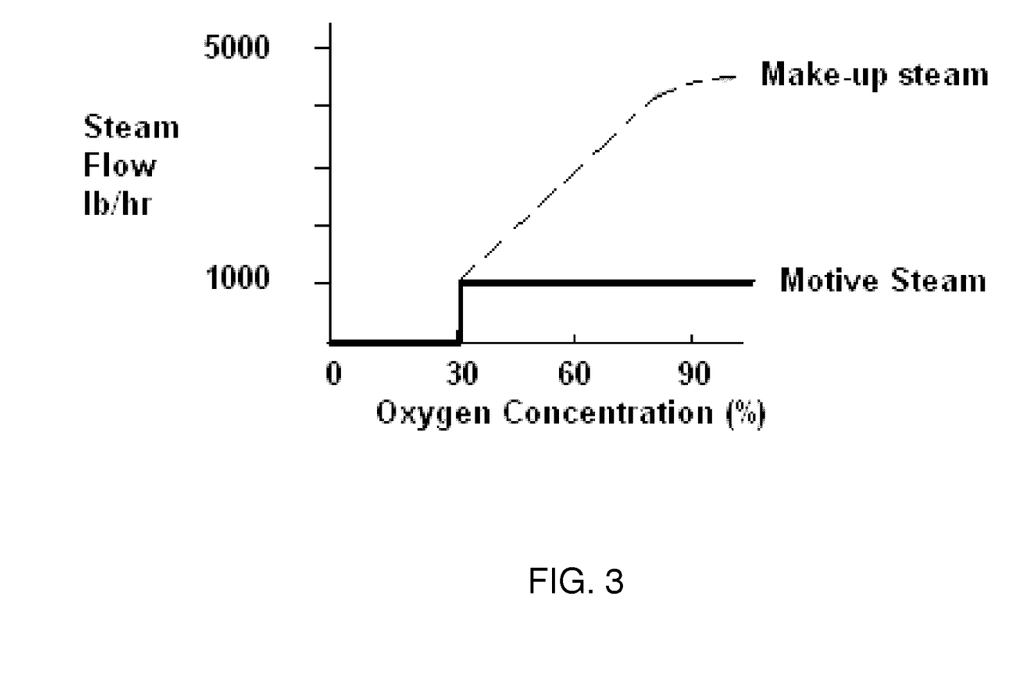
FIG. 3 is a chart showing the relationship between the stream flow rate and the oxygen concentration in one embodiment.

Without wishing to be bound by the theory, the inventors believe that the steam acts as a heat sink for moderating the temperature of the combustion products in the reaction furnace. The inventors also believe that the presence of the steam favourably shifts the Claus furnace reactions to lower the oxygen demand, thus further reducing the flame and furnace temperatures. By lowering the operating temperature of the reaction furnace in this way, it is possible to increase the oxygen concentration to higher levels while maintaining the furnace temperature below the desired level. For example, as illustrated in the chart of FIG. 3, additional steam, also referred to as a "make-up steam", may be introduced to moderate the furnace temperature at higher oxygen levels (e.g. above 30%). In FIG. 3, while the flow rate of the motive steam is kept at a constant level as the oxygen concentration is increased beyond 30%, make-up steam is introduced separately from the motive steam to maintain the furnace temperature at an acceptable level. For example, make-up steam may be introduced directly into the burner 120 through an inlet stream, which is operated independently from the steam supply line 20. Alternatively, the make-up steam may be combined with the motive steam and introduced to the ejector 26 by line 20, and into the reaction furnace 130.

In one embodiment, a pressurized liquid water stream is injected into the burner 120 by itself. In another embodiment, the pressurized liquid water stream is injected into the burner 120 in combination with steam. For example, the pressurized liquid water stream may be introduced together with the motive steam and the make-up steam, if present.

Even in cases where the plant operator does not wish to increase the oxygen concentration in the reaction furnace 130, the introduction of steam may still be beneficial, since steam lowers the oxygen demand while maintaining substantially the same level of throughput. By lowering the amount of oxygen that is required, the operating costs associated with purchasing and/or producing pure oxygen is reduced. Moreover, since steam lowers the operating temperature inside the reaction furnace 130, a furnace operated with steam would experience less thermal stress while maintaining substantially the same level of throughput as a furnace operated without steam. Imposing less thermal stress on the burner and the furnace material may potentially increase the lifespan of the furnace and various components therein.

In cases where the motive fluid comprises nitrogen or carbon dioxide, the motive fluid may still act as a heat sink to moderate the temperature of the combustion products in the reaction furnace, thus increasing capacity. Specifically with regard to carbon dioxide, it is believed that the introduction of carbon dioxide may shift the thermodynamic equilibrium of the furnace reactions to favour formation of the products. In cases where sulfur dioxide is introduced as the motive fluid, it can also shift the equilibrium of the Claus reactions to favour formation of the products, since sulfur dioxide is one of the reactants. Introducing sulfur dioxide also reduces the amount of oxygen that is required in the reaction, since less hydrogen sulfide will need to be reacted with oxygen to form hydrogen sulfide.

For at least one implementation of the sulfur recovery system, Computational Fluid Dynamic (CFD) modelling was used to analyze the dynamics of the Sulphur Recovery Unit (SRU) flame. Specifically, the CFD modelling was performed in order to gain further understanding of the potential capabilities of the high pressure ejector system and the resulting kinetic and thermodynamic effects on the SRU thermal stage flame zone. By analyzing the CFD model, it was found that some regions of the SRU flame may possess substantially higher temperatures compared to other regions of the flame. Accordingly, it can be considered that certain beneficial chemical reactions may be promoted in these higher temperature regions from the use of the ejector pressurized gas stream. Furthermore, it can be considered that the effects provided by such reactions may be enhanced by manipulating the flame pattern and characteristics, such that the pressurized gas stream is injected into the preferred regions of the burner.

Returning to FIG. 2, in 550, back pressure valves 150, 170 are used to increase the operating pressure in the sulfur recovery block 140 and/or the TGTU block 160. For example, the operating pressure in the sulfur recovery block 140 may be increased by restricting the flow of gas exiting the sulfur recovery block 140 using the second back pressure valve 150. Similarly, restricting the flow of gas exiting the TGTU block 160 using the first back pressure valve 170 increases the operating pressure of the TGTU block 160. It will be appreciated that in some configurations, the first back pressure valve 170 may be used to moderate the operating pressure of both the sulfur recovery block 140 and the TGTU block 160.

As mentioned above, elevating the operating pressure of sulfur recovery block 130 and/or TGTU block 160 enhances the recovery of sulfur from acid gas feed stream primarily due to Le Chatelier's principle. For example, since the reactants for the Claus reactions are generally gases, increasing the pressure of the reaction vessels shifts the equilibrium of the reactions such that formation of the products is favored. Increase in the operating pressure also reduces the flow velocities of the reactant gases, thus increasing the residence time of the reactant gases in the reaction vessels.

Increased residence time may give rise to higher conversion of the reactants in some cases.

Although various embodiments of the apparatus have been described with reference to an ejector, it will be appreciated that other mechanisms for increasing the pressure of the feed source and introducing steam may be used instead. For example, a mechanical blower and/or compressor may be used to increase the pressure of the amine acid gas stream, and steam may be added to the amine acid gas stream before or after the pressure is increased. However, the use of the ejector may be advantageous over other pressure enhancing mechanisms due to the ease of maintenance and relatively high reliability, especially in long-term operations. It is noted that an ejector may also be referred to as an eductor or thermocompressor in the industry.

It will be appreciated that although various embodiments have been described with relation to valves, other flow restriction devices or back pressure enhancing strategies, such as dampers, moveable gates, and shutters may be used instead of valves.

It will be understood that although various embodiments have been described with reference to oxygen enriched plants and systems, substantially the same method and apparatus may be applied to air-based plants and systems in which no supplemental oxygen is introduced to the reaction furnace.

It will also be appreciated that although the apparatus and method have been described herein with reference to sulfur recovery processes, similar apparatuses and methods may be used in conjunction with other processes not involving sulfur recovery.

Although the method and apparatus have been described with reference to certain specific embodiments, various modifications thereof will be apparent to those skilled in the art. Any examples provided herein are included solely for the purpose of illustrating the method and apparatus and are not intended to limit the invention in any way. Any drawings provided herein are solely for the purpose of illustrating various aspects of the invention and are not intended to be drawn to scale or to limit the invention in any way. The scope of the claims appended hereto should not be limited by the preferred embodiments set forth in the above description, but should be given the broadest interpretation consistent with the present specification as a whole. The disclosures of all prior art recited herein are incorporated herein by reference in their entirety.

I claim:

1. A sulfur recovery system comprising:
   a reaction furnace and an ejector;
   at least one of an amine gas treating system or a sour water stripper producing an acid gas;
   a motive fluid stream for providing a motive fluid to the ejector;
   an acid gas stream for providing the acid gas from the at least one of the amine gas treating system or the sour water stripper to a suction of the ejector, the ejector connected to the reaction furnace for providing to the reaction furnace a mixture comprising the motive fluid and the acid gas; and
   a combustion gas supply stream connected to the reaction furnace for providing a combustion gas to the reaction furnace, the combustion gas comprising oxygen.

2. The sulfur recovery system of claim 1, wherein the acid gas comprises amine acid gas.

3. The sulfur recovery system of claim 1, wherein the acid gas comprises between 5 and 100 mole percent hydrogen sulfide.

4. The sulfur recovery system of claim 1, further comprising an oxygen stream connected to the reaction furnace for providing oxygen to the reaction furnace.

5. The sulfur recovery system of claim 1, wherein the motive fluid comprises steam.

6. The sulfur recovery system of claim 1, wherein the motive fluid comprises pressurized liquid water, water vapor, hydrogen sulfide, sulfur dioxide, carbon dioxide, or mixtures thereof.

7. The sulfur recovery system of claim 1, further comprising a sulfur recovery block connected to the reaction furnace for receiving an effluent stream from the reaction furnace, and a pressure control valve positioned downstream from the sulfur recovery block for controlling the operating pressure of the sulfur recovery block.

8. The sulfur recovery system of claim 1, further comprising a sulfur recovery block connected to the reaction furnace for receiving an effluent stream from the reaction furnace, a tail gas treatment unit connected to the reaction furnace for receiving a tail gas stream from the sulfur recovery block, and a pressure control valve positioned downstream from the tail gas treatment unit for controlling the operating pressure of at least one of the tail gas treatment unit and the sulfur recovery block.

9. The sulfur recovery system of claim 1, wherein the combustion gas comprises air or air and supplemental oxygen.

10. The sulfur recovery system of claim 1, further comprising:
    a make-up steam stream to maintain the reaction furnace temperature at an acceptable level; and
    a pressurized liquid water stream injected into a burner of the reaction furnace.

11. A sulfur recovery system comprising:
    a reaction furnace and an ejector;
    a motive fluid stream for providing a motive fluid to the ejector;
    at least one of an amine gas treating system or a sour water stripper producing an acid gas stream fluidly connected to a suction of the ejector, the ejector providing a mixture comprising the motive fluid and the acid gas;
    a vapor-liquid separator for separating out any liquid present in the mixture and for providing the separated gas to the reaction furnace; and
    a combustion gas supply stream connected to the reaction furnace for providing a combustion gas to the reaction furnace, the combustion gas comprising oxygen.

12. The sulfur recovery system of claim 11, wherein the acid gas comprises amine acid gas.

13. The sulfur recovery system of claim 11, wherein the acid gas comprises between 5 and 100 mole percent hydrogen sulfide.

14. The sulfur recovery system of claim 11, further comprising an oxygen stream connected to the reaction furnace for providing oxygen to the reaction furnace.

15. The sulfur recovery system of claim 11, wherein the motive fluid comprises steam.

16. The sulfur recovery system of claim 11, wherein the motive fluid comprises pressurized liquid water, water vapor, hydrogen sulfide, sulfur dioxide, carbon dioxide, or mixtures thereof.

17. The sulfur recovery system of claim 11, further comprising a sulfur recovery block connected to the reaction furnace for receiving an effluent stream from the reaction furnace, and a pressure control valve positioned downstream from the sulfur recovery block for controlling the operating pressure of the sulfur recovery block.

18. The sulfur recovery system of claim 11, further comprising a sulfur recovery block connected to the reaction furnace for receiving an effluent stream from the reaction furnace, a tail gas treatment unit connected to the reaction furnace for receiving a tail gas stream from the sulfur recovery block, and a pressure control valve positioned downstream from the tail gas treatment unit for controlling the operating pressure of at least one of the tail gas treatment unit and the sulfur recovery block.

19. The sulfur recovery system of claim 11, further comprising:
- a make-up steam stream to maintain the reaction furnace temperature at an acceptable level; and
- a pressurized liquid water stream injected into a burner of the reaction furnace.

* * * * *